Figure 1:
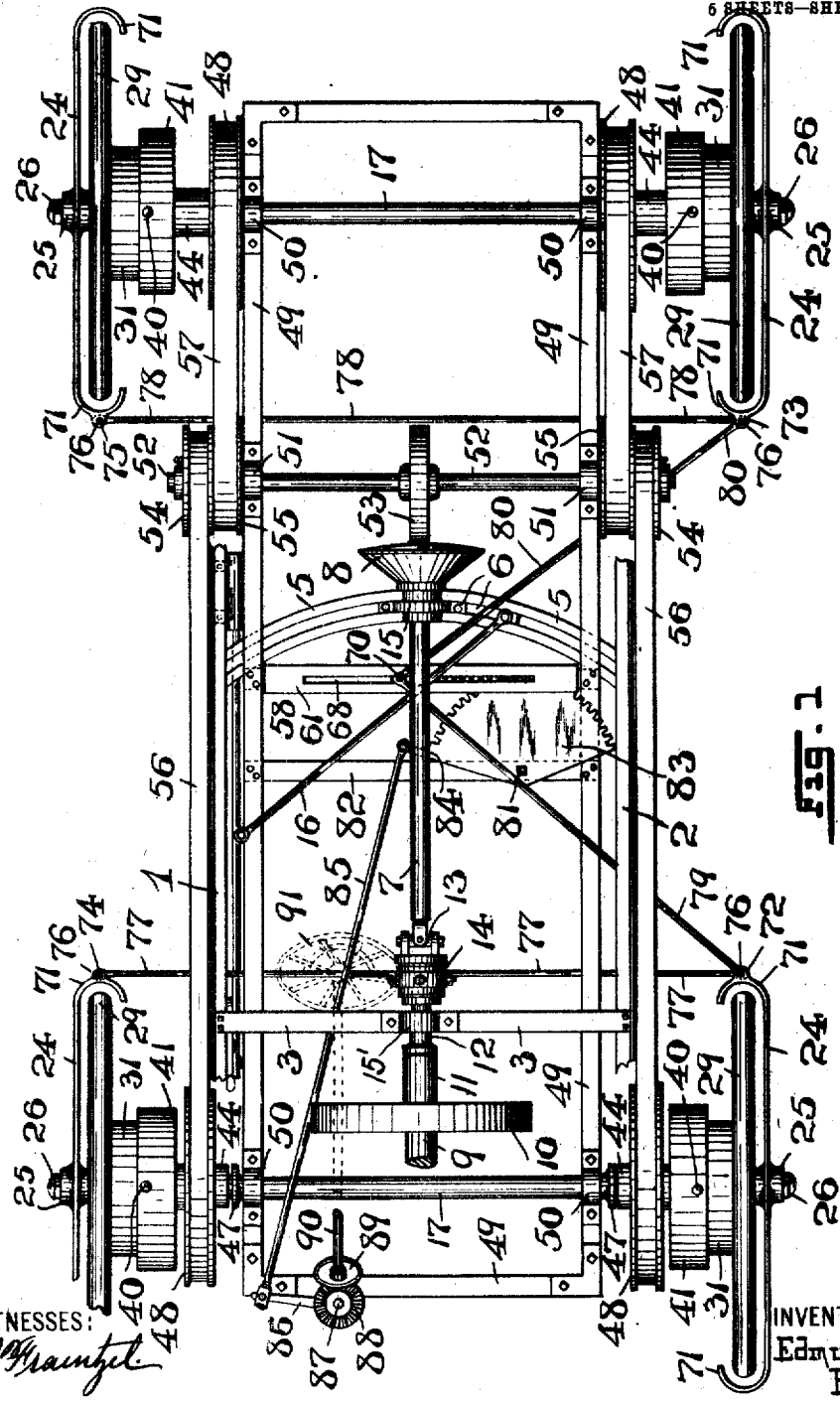

E. R. HALSEY.
STEERING MECHANISM FOR MOTOR VEHICLES.
APPLICATION FILED MAR. 27, 1908.

913,494.

Patented Feb. 23, 1909.

5 SHEETS—SHEET 1.

WITNESSES:

INVENTOR:
Edmund R. Halsey

BY
Frentzel and Richards,
ATTORNEYS

E. R. HALSEY.
STEERING MECHANISM FOR MOTOR VEHICLES.
APPLICATION FILED MAR. 27, 1908.

913,494.

Patented Feb. 23, 1909.
5 SHEETS—SHEET 2.

WITNESSES:
F. C. W. Fraentzel
Anna H. Aten

INVENTOR:
Edmund R. Halsey,
BY
Fraentzel and Richards
ATTORNEYS

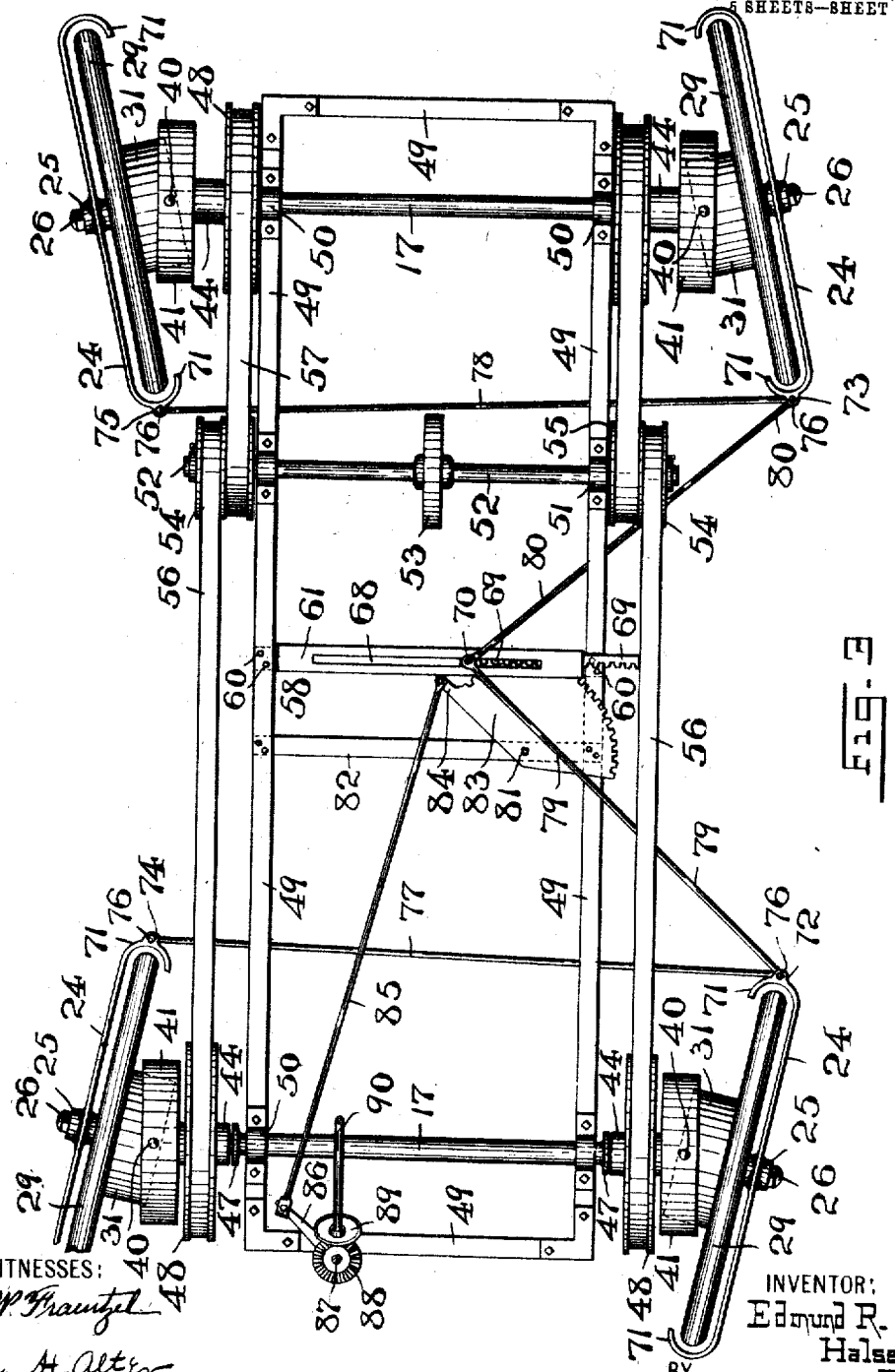

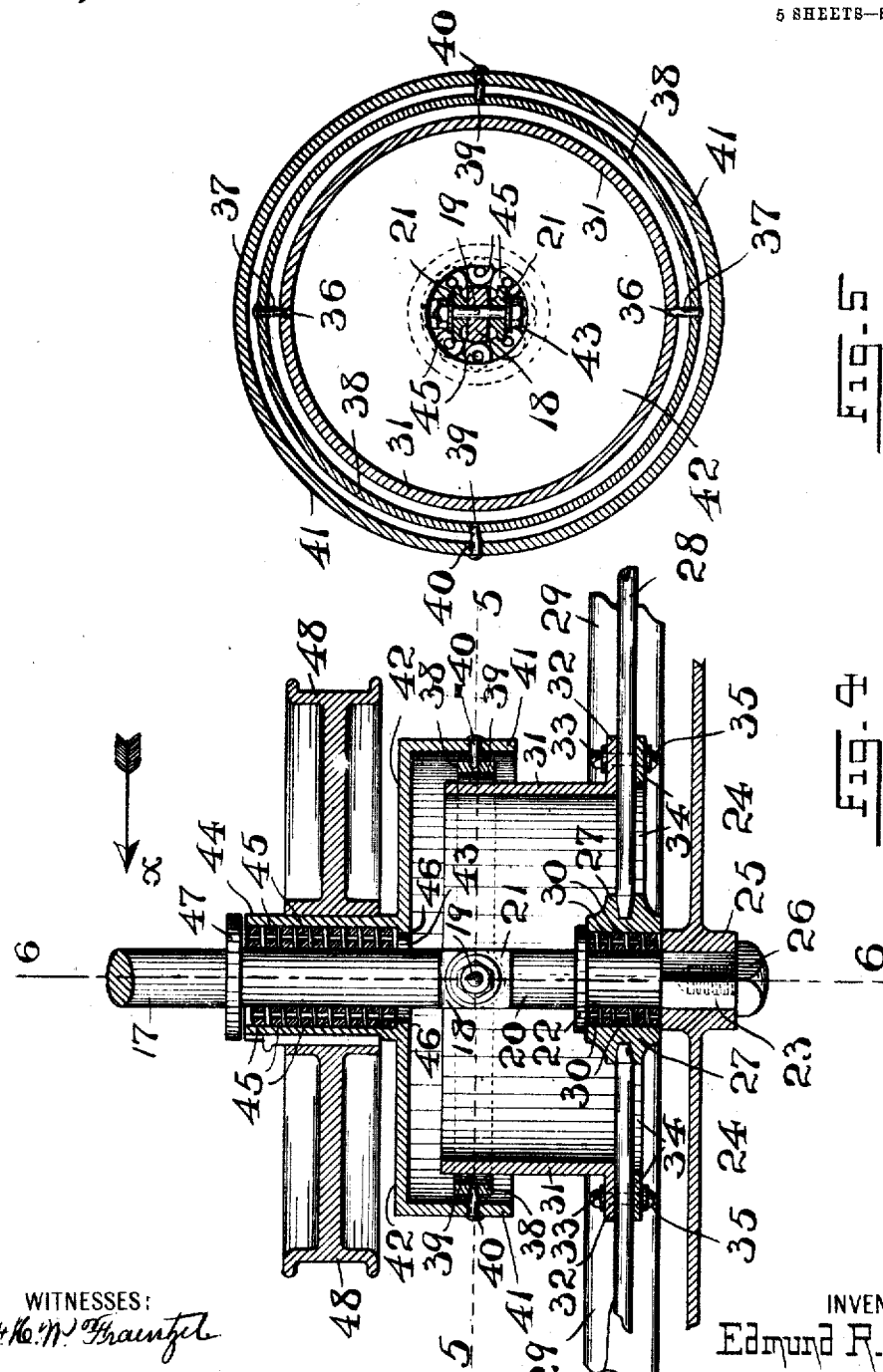

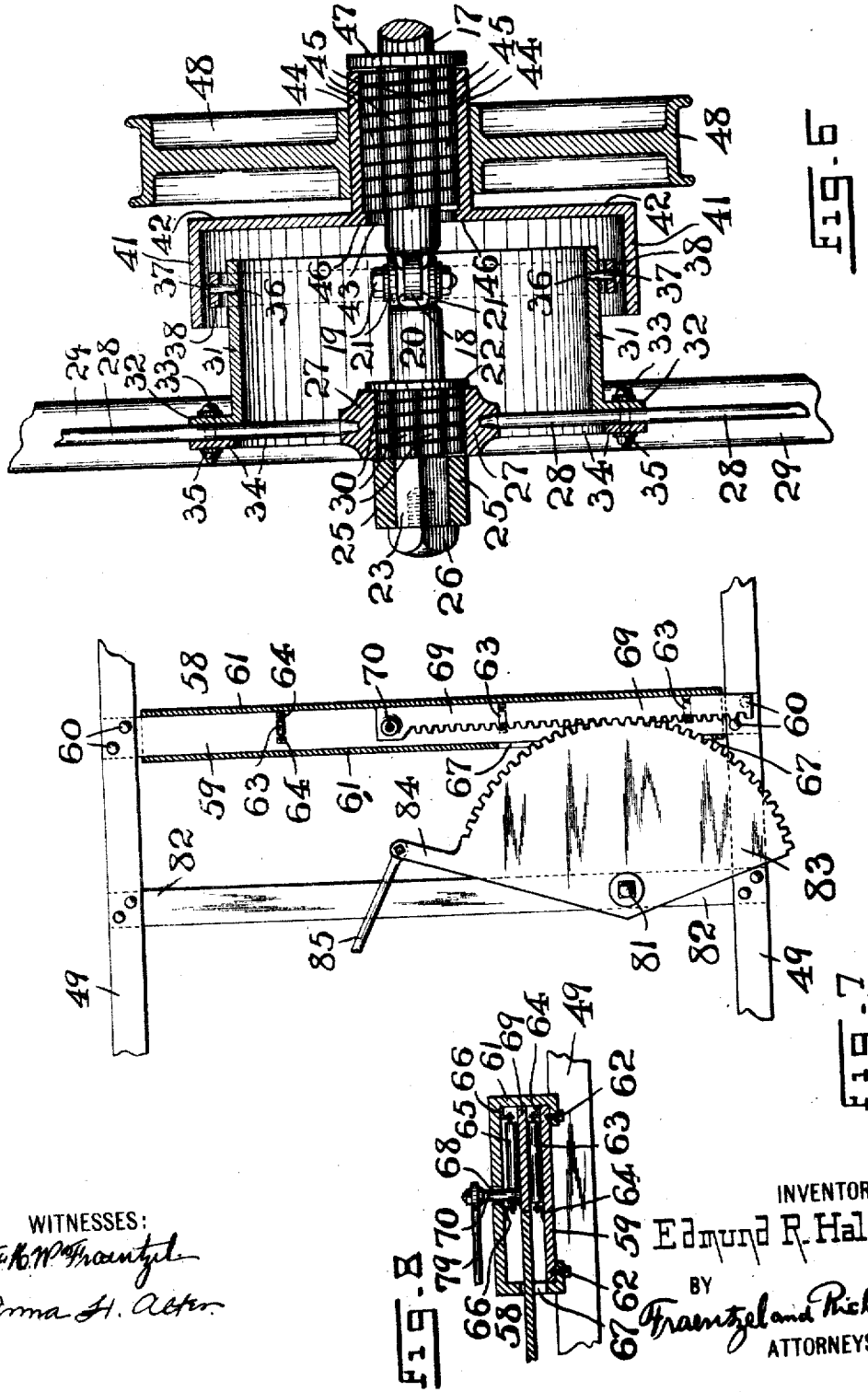
E. R. HALSEY.
STEERING MECHANISM FOR MOTOR VEHICLES
APPLICATION FILED MAR. 27, 1908.
913,494.
Patented Feb. 23, 1909.
5 SHEETS—SHEET 5.
WITNESSES:
INVENTOR:
Edmund R. Halsey
BY
Fraentzel and Richar
ATTORNEYS.

UNITED STATES PATENT OFFICE.

EDMUND R. HALSEY, OF SOUTH ORANGE, NEW JERSEY.

STEERING MECHANISM FOR MOTOR-VEHICLES.

No. 913,494.　　　　　Specification of Letters Patent.　　　Patented Feb. 23, 1909.

Application filed March 27, 1908. Serial No. 423,541.

*To all whom it may concern:*

Be it known that I, EDMUND R. HALSEY, a citizen of the United States, residing at South Orange, in the county of Essex and State of New Jersey, have invented certain new and useful Improvements in Steering Mechanism for Motor-Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in motor-vehicles; and, the invention relates, more particularly to a novel steering-means or mechanism, and to a novel driving means, for use mainly in automobiles.

The present invention has for its principal object to provide a novel and simply constructed steering-mechanism for motor-vehicles, which is under the perfect control of the operator seated in the vehicle and shall be efficient in its operation, the steering means being arranged and constructed in such a manner that both front and rear-wheels are simultaneously moved out of their normal alinement, while passing around a corner or while moving in the arc-of-a circle; and, furthermore, to provide a novel steering mechanism which when operated will move or turn the two front-wheels angularly in one direction to the vertical plane of the central longitudinal axis of the vehicle and simultaneously therewith will move or turn the rear wheels angularly in the opposite direction to the angular movement of the front wheels, so that the front and rear wheels of the vehicle will move upon the same arc when turning a corner, whereby all possibility of skidding is fully overcome, and the danger of striking the curb with the rear wheels, while turning a corner, is avoided.

The invention has for its further object to provide a novel connection or joint between the respective end-portions of the non-revolving and non-oscillating front and rear axles of the respective front and rear wheels of a vehicle, such connections being made in the manner of universal joints, and operating substantially in the manner and for the purposes hereinafter more fully set forth.

The invention has for its further object to provide a novel and simply arranged and efficient driving-mechanism of the general character hereinafter more particularly set forth, adapted for use with vehicles of the various kinds, and more especially with such vehicles or automobiles which are driven from a motor, the arrangement and construction of the parts being such that the power which is generated is transmitted to both the front and rear wheels of the vehicle, so as to produce an equal distribution of power to both front and rear wheels, and producing at the same time a uniform wear and tear of the usual rubber tires of the wheels, so that the tires of the front wheels will be of the same life as the tires of the rear wheels, all other things being equal.

Other objects of this invention not at this time more particularly enumerated will be clearly understood from the following detailed description of the invention.

With the various objects of my present invention in view, the same consists, firstly, in the novel steering means or mechanism for simultaneously turning or moving both the front and rear wheels out of their normally vertical planes parallel to the vertical plane of the central longitudinal axis of the vehicle; secondly, in the novel means of connection or knuckle joints between the respective ends of both front and rear axles and their respective wheels; and, thirdly, to provide a novel driving mechanism for the purpose of applying and producing an equal distribution of power to both front and rear wheels of the vehicle.

The invention consists, furthermore, in the various arrangements and combinations of devices and parts, as well as in the details of the construction of the same, all of which will be more fully described in the following specification, and then finally embodied in the clauses of the claims which are appended to and which form an essential part of this specification.

The invention is clearly illustrated in the accompanying drawings, in which:—

Figure 2:
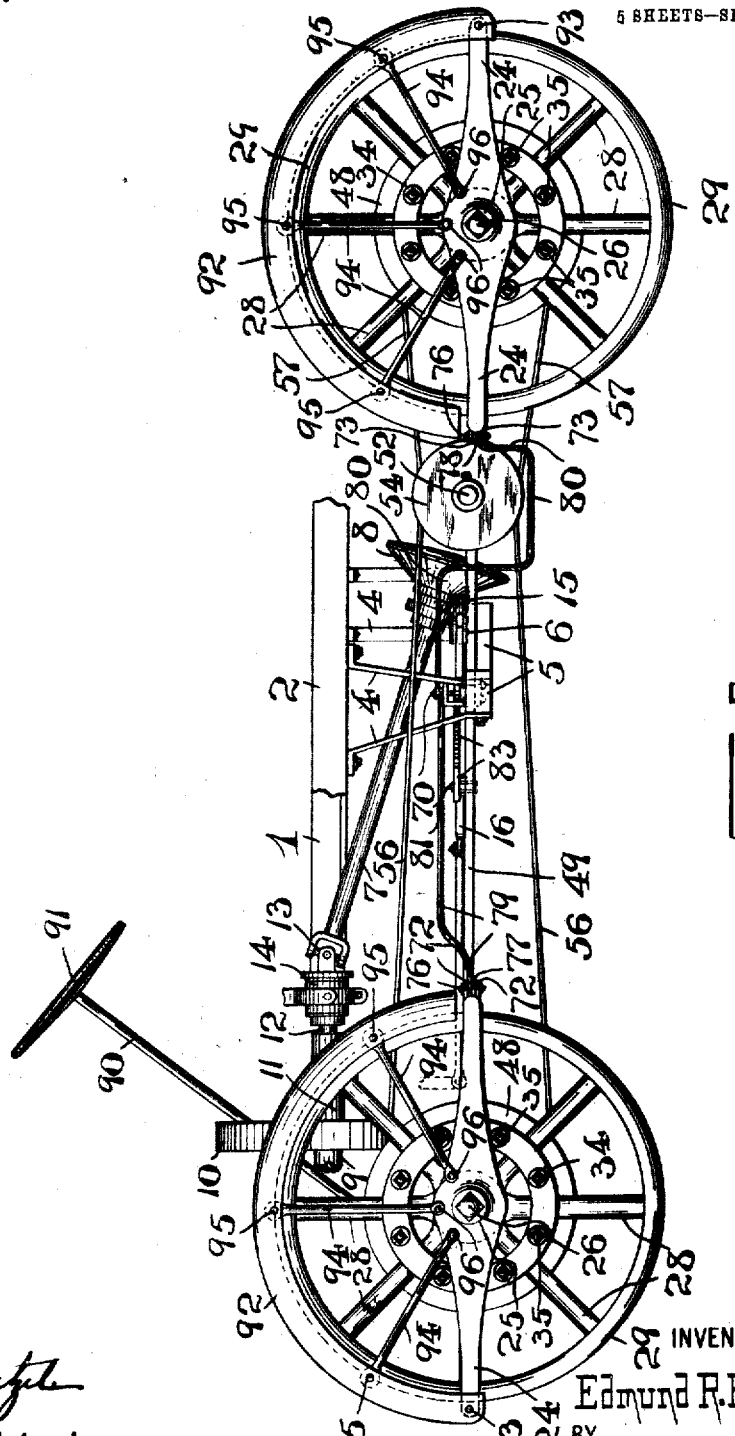

Figure 1 is a plan view of a frame-work and the front and rear axles and wheels, said view showing in connection therewith, also in plan, one form of steering means or mechanism, the connections between the end-portions of the axles and their respective wheels, and a driving-mechanism for transmitting power simultaneously to both the front and rear wheels, all made according to and embodying the principles of the present invention, the respective front wheels being shown in their normally vertical alinement with the respective rear wheels of the vehicle. Fig. 2 is a side elevation of the devices and parts represented in said Fig. 1, certain parts of the frame-work being shown broken away. Fig. 3 is a similar view to Fig. 1, said view, however, showing the parts of the steering-mechanism operated and the respective front and rear wheels turned out of their normally vertical alinement, the wheels being set in vertical planes at angles to the vertical plane of the central longitudinal axis of the vehicle, certain parts of the driving mechanism having been omitted from this view. Fig. 4 is a horizontal sectional representation, of one of the wheel-connections or knuckle-joints and a pulley-wheel, said view showing in elevation, portions of an axle, the rim of a wheel and spokes thereof, and the connecting member between the wheel and end-portion of the axle, said view being made on an enlarged scale. Fig. 5 is a transverse vertical section, taken on line 5—5 in said Fig. 4. Fig. 6 is a longitudinal vertical section, taken on line 6—6 in said Fig. 4, looking in the direction of the arrow x. Fig. 7 is a horizontal sectional representation of a rack-box, and plan view of a portion of the frame-work which carries the said box, said view also illustrating in plan view, a sliding rack within said box and an oscillatory toothed sector, the teeth of which are in mesh with the teeth of the rack; and Fig. 8 is a transverse sectional representation of said rack-box, said rack, and part of said toothed sector, said view being made on an enlarged scale.

Similar characters of reference are employed in all of the above described views, to indicate corresponding parts.

Referring now to the several figures of the drawings, the reference-characters 1 and 2 indicate portions of the two longitudinally extending side-bars or beams of the chassis or main frame of the lower body of an automobile, and 3 is a cross-bar suitably connected at its ends to said side-bars or beams 1 and 2. Suitably secured to and extending in downward directions from said side-bars or beams 1 and 2 are brackets, as 4, which carry an arc-shaped guide-bar or truss 5, preferably in the manner and of the construction of the device described and illustrated in my former patent No. 880,732.

Movably arranged in the guiding portion of said guide-bar or truss is a slide or element 6, formed with a bearing member 15 in which is rotatably mounted a transmission shaft 7 provided upon its free end with a friction-disk or element 8, which is preferably made cone-shaped, as illustrated.

The reference-character 9 indicates a portion of the power-driven or motor-shaft, and 10 is a fly-wheel suitably mounted upon said shaft. Slidably arranged within an angularly formed receiving socket within an enlargement 11 with which the shaft 9 is provided is the correspondingly formed end-portion of a short shaft-member or element 12, which is operatively connected with the transmission-shaft 7 by means of a knuckle-connection 13 and means, as 14, for producing longitudinal reciprocatory movements of the transmission shaft, said shaft-member 12 being rotatably mounted in a bearing 15' upon said cross-bar 3. So much of the driving mechanism hereinabove set forth is fully described in the specification and illustrated in the drawings of my former patent No. 880,732, and its operation will be understood therefrom. It will be evident, however, that other driving devices and parts may be used in lieu of the devices and parts mentioned in the foregoing. The sliding movements of the slide or element 6, and of the transmission shaft 7 and the friction-disk or element 8, is produced by means of a link or rod 16, and such other operating devices, as fully described and illustrated in said Letters Patent No. 880,732.

The front and rear axles of the vehicle are indicated by the reference-character 17, each axle being provided at each of its ends with an eye-portion or perforated ear-like member 18, carrying a pintle 19 of any suitable construction. Both of said shafts are fixed, so as to be non-revolving and non-oscillating. Pivotally connected with each eye-portion or member 18 and oscillating horizontally upon each pintle 19, are the embracing eye-portions or ear-like members 21 of the short axle-members or elements 20, each shaft having such a short axle-member or element operatively connected with each end thereof. Each axle-member or element 20 is preferably made with an annular flange 22, and a squared or other angularly formed portion 23, upon which is arranged and held against turning the correspondingly formed hub-like part 25 of a horizontally or approximately horizontally disposed bar or plate-like member 24, a suitably formed stud-bolt 26, or other fastening device being employed for securing each bar or member 24 in its proper position upon the free end-portion of each axle-member or element 20. Rotatably arranged upon that portion of each axle-member or element 20, between the flange 22 and the squared or angularly formed part 23, is the hub 27 from which radiate the usual spokes 28 to the rim 29 of each wheel. Suitable rollers 30, or other anti-friction devices, may be arranged within the hub of each wheel and that portion of the axle-member or element upon which the hub is disposed.

Concentric with each axle-member or element 20 is a tubular cylinder, as 31, said cylinder being preferably provided with an annular flange 32, formed with suitably disposed bolt-receiving holes, said flange 32 being arranged upon the inner surface portions of the spokes 28, bolts 33 extending through the holes or perforations in the flange 32, and between the spokes, said bolts extending through corresponding holes or perforations in a ring 34, which is arranged upon the opposite or outer surface-portions of the spokes and is secured in place by means of nuts 35, screwed upon the screw-threaded end-portions of the several bolts 33. As shown, each cylinder 31 is open at both ends, so that the end-portion of an axle and the axle-member or element 20 will extend centrally into and through the cylinder 31, substantially in the manner illustrated more particularly in Figs. 4 and 6 of the drawings.

Referring now to Fig. 5, it will be seen that the said cylinder 31 is provided with oppositely disposed holes or openings 36, into which extend and are loosely fitted the end-portions of suitable pivot-pins 37 which are connected with and extend inwardly from a ring 38. By means of these pins, the said ring is concentrically arranged about the cylinder 31, said cylinder and ring having also an oscillatory relation to each other, as will be clearly evident and for the purposes hereinafter more fully specified. Each ring 38 is also provided in its opposite sides, and in a plane at right angles to the plane of the two oppositely disposed pivot-pins 37, with holes or openings 39 into which extend and are loosely fitted a second set of pivot-pins 40 which are connected with and extend inwardly from another ring or cylindrical member 41. By means of the pins 40, the ring or cylindrical member 41 is concentrically arranged about both the ring 38 and the cylinder 31, said ring or member 41 having also an oscillating relation to the said ring 38 and the cylinder 31. Each ring or cylindrical member 41 is preferably closed, as at 42, the closed side 42 being formed with a centrally disposed opening 43 and with a rearwardly extending tubular portion 44, through which and the said opening 43 the end-portion of the axle extends, substantially as shown. In rolling arrangement between the interior of each tubular portion 44 and that portion of each shaft arranged therein, there may be suitable roller-bearings, as 45, or other suitably formed anti-friction bearings, as will be clearly evident, the bearings being retained in place preferably by the shouldered part 46 of the side 42 and an annular flange 47 upon the axle, as shown; but, it will be evident, that any other suitably formed retaining means may be employed, if desired. Suitably secured upon the tubular portion 44 of each ring or cylinder 41 is a pulley or grooved wheel, as 48, or other suitably formed wheel, which is set in motion by means of the driving-mechanism, to be presently described, and by means of each pulley or wheel 48, and the cylindrical tubular members 41, 38 and 31, transmitting the power to the spokes and rims of all the wheels of the vehicle and causing them to revolve.

Referring now to Figs. 1 and 3 of the drawings, it will be seen, that there is mounted and secured upon the front and rear axles of the vehicle, by means of suitable bearings 50, or in any other desirable manner, a suitably constructed frame 49. This frame is provided with bearings 51 in which is rotatably mounted a driving-shaft 52 carrying a friction disk or plate 53. The disk or plate 53 is adapted to be engaged by the friction disk or element 8 of the transmission shaft 7 for revolving the said disk or plate 53 and the driving shaft 52, in the manner set forth in my previous patent No. 880,732, although any other suitable driving means may be used for operating the shaft 52. At or near its respective end-portions the shaft 52 is provided with suitably formed pulleys or wheels 54 and 55, suitable flexible means of power-transmission, as 56, such as belts, cables, or the like, being passed over the pulleys or wheels 54 and the pulleys or wheels 48 for driving the front wheels of the vehicle, and other flexible means of power-transmission, as 57, as belts, cables, or the like, being passed over the pulleys or wheels 55 and the pulleys or wheels 48 for driving the rear wheels of the vehicle.

It will thus be seen from the foregoing description, that I have provided a simple means for transmitting power simultaneously to both front and rear wheels of the vehicle, through the intermediately disposed oscillating rings or cylindrical members, which, with the knuckle-connection between the end-portion of an axle and the axle-member or element 20, form suitable universal joints or connections at the respective end-portions of the front and rear axles of the vehicle for permitting each wheel of the vehicle to be turned or moved out of its vertical plane normally parallel to the vertical plane of the central longitudinal axis of the vehicle, without in the least interfering with the rotary movements of the various parts 41, 38 and 31, and the wheels of the vehicle.

The steering-mechanism for bringing the wheels of the vehicle into their angular relation for steering or turning purposes is shown more particularly in Figs. 1, 2, 3, 7 and 8 of the drawings, and the same comprises a suitably constructed rack-box 58, consisting usually of a lower plate or bar 59 which is suitably secured at its ends, by means of rivets or bolts 60, or other means, to the side-bars of the frame 49, and a channel-shaped bar 61, said parts being arranged substantially in the manner illustrated more particularly in Figs. 7 and 8 of the drawings, and being secured together by means of screws or bolts 62, all of said parts providing a box-like structure formed with open ends and forming a suitable and laterally extending guide.

The lower plate or bar 59 may be provided with suitably disposed rollers 63 journaled in brackets 64, and the channel-shaped bar 61 may also be provided with rollers 65 journaled in brackets 66 which extend downwardly from the inner surface of the top of the box-like structure. In one of its sides the said structure is made with an opening 67 and in its top it has a slot or opening 68. Slidably arranged between the surfaces of the rollers 63 and 65 is a laterally movable sliding element, preferably, in the form of a rack 69 which is provided with a stud or post 70 extending into and through the slot or opening 68, so as to project above the upper surface of said box-like structure, substantially as shown.

As shown in the several figures of the drawings, the several bars or plate-like members 24 which are arranged upon the portions 23 of the horizontally oscillating axle-members or elements 20 are curved at their ends, as at 71, so as to extend around the outer peripheral surfaces of the tires of the wheel, substantially in the manner illustrated. The curved portions at the one end of said plate-like members or bars 24 upon one side of the frame 49 are made with perforated ears or lugs 72 and 73, respectively, while the curved portions at the one end of said plate-like members or bars 24 located upon the other side of the frame 49 are made with perforated ears or lugs 74 and 75, respectively, all of said perforated ears or lugs carrying a pivot-pin or bolt 76, substantially as shown in Figs. 1 and 3 of the drawings. A laterally extending link or rod 77 is pivotally connected at its respective ends, by means of said pins or bolts 76, with the respective ears or lugs 72 and 74 of the bars or plate-like members 24 located on opposite sides of the frame-work and at the front end portion of the same, and a second link or rod 78 is likewise pivotally connected at its respective ends, by means of the pins or bolts 76, with the respective lugs or ears 73 and 75 of the bars or plate-like members 24 located on opposite sides of the frame-work and at the rear end-portion of the same, substantially as clearly illustrated in Figs. 1 and 3 of the drawings. Pivotally connected with the end of the stud or post 70 which extends through the slot 68 in the rack-box are the ends of a pair of links or rods 79 and 80, the link or rod 79 having its other end pivotally connected with the lug or ear 72, and the other link or rod 80 having its opposite end pivotally connected with the lug or ear 73.

Oscillating upon a pivot or post, as 81, extending upwardly from a cross-bar 82, suitably secured at its ends to the frame 49, is a toothed sector 83, said sector having its toothed arc-shaped portion projecting into and through the opening 67 in the side of the rack-box, and the teeth of said sector being in mesh with the teeth of the rack 69. The sector 83 is formed with an extension or arm 84, with which is pivotally connected one end of a connecting rod or link 85, said rod or link being pivotally connected at its opposite end with a crank-arm 86 which is secured to and extends from a spindle or shaft 87 suitably mounted upon the frame-work 49, preferably at the front end-portion of the same. The said spindle or shaft 87 is provided with a bevel-gear 88, and in mesh with said gear 88 is a bevel-gear 89 which is mounted upon the steering-spindle or rod 90, extending upwardly into the body of the vehicle, and provided with a steering-wheel 91, directly in front of the chauffeur or operator seated within the vehicle.

The steering operation will be clearly understood from an inspection of Figs. 1, 3, 7 and 8, of the drawings, and need not be further described. It will be seen, that when the steering-wheel 91 is turned in either direction, as may be desired, the result will be that the toothed sector 83 causes a sliding movement of the rack 69 in the proper direction, causing all the wheels of the vehicle to be swung out of the vertical alinement with each other, indicated in Fig. 1 of the drawings, into an angular relation, such as is shown in Fig. 3 of the drawings, the angular arrangement of the two front wheels to the vertical plane of the longitudinal central axis of the vehicle being opposite from the angular arrangement of the two rear wheels to the same vertical plane of the longitudinal central axis of the vehicle. The advantages of this will be clearly evident. It will be seen, that thereby all danger of the vehicle "skidding" is clearly overcome, and the rear-wheels being caused to roll upon the same arcs as the front wheels, the operator has only to be careful in turning a corner that the front wheels will clear the corner, or the curb located at that point, and it will follow that the oppositely moved rear wheels will turn the corner upon the same arc as the front wheels, so that there can be no possibility of the rear wheels striking the curb at the corner, as might be the case where the rear wheels remain in fixed vertical planes which are parallel to the vertical plane of the longitudinal central axis of the vehicle.

Referring now to Fig. 2 of the drawings, it will be seen, that the said plate-like members or bars 24 have suitably connected therewith suitably formed mud-guards 92, which are secured to said members or bars 24, at one end by means of rivets 93 and by means of radial arms or rods 94, secured at their ends by means of rivets 95 and 96, respectively, to the mud-guards and to the hubs or other suitable portions of said members or bars 24.

I am fully aware that changes may be made in the arrangements and combinations of the various devices and parts, as well as in the details of the construction of the same, without departing from the scope of the present invention, as defined in the appended claims. Hence I do not limit my invention to the exact arrangements and combinations of the devices and parts as described in the foregoing specification, nor do I confine myself to the exact details of the construction of any of the said parts as illustrated in the accompanying drawings.

I claim:

1. In a motor-vehicle, the combination with the front and rear axles and the front and rear wheels, of a means of pivotal connection between the end-portions of the axles and said wheels, each wheel being arranged upon a portion of each means of pivotal connection and having a revolving relation thereto, a bar-like member at the side of each wheel and mounted upon a portion of said means of pivotal connection, laterally extending links pivotally connected at their ends with the bar-like members of each pair of front wheels and each pair of rear wheels, respectively, a laterally extending guide, a sliding element movably arranged in said guide, a post extending from said sliding element, a second pair of links pivoted at one end to said post and each link being pivotally connected at its opposite end with the bar-like member of a front and rear wheel, respectively, and means connected with said sliding element for actuating all of said link-connections, substantially as and for the purposes set forth.

2. In a motor-vehicle, the combination with the front and rear axles and the front and rear wheels, of a means of pivotal connection between the end-portions of the axles and said wheels, each wheel being arranged upon a portion of each means of pivotal connection and having a revolving relation thereto, a bar-like member at the side of each wheel and mounted upon a portion of said means of pivotal connection, laterally extending links pivotally connected at their ends with the bar-like members of each pair of front wheels and each pair of rear wheels, respectively, a slidably arranged rack provided with an upwardly extending post, a second pair of links pivotally connected at one end with said post and each link being pivotally connected at its opposite end with the bar-like member of a front and rear wheel, respectively, a toothed sector in mesh with the rack for operating the same, and means for oscillating said toothed sector, substantially as and for the purposes set forth.

3. In a motor-vehicle, the combination with the front and rear axles and the front and rear wheels, of a means of pivotal connection between the end-portions of the axles and said wheels, each wheel being arranged upon a portion of each means of pivotal connection and having a revolving relation thereto, a bar-like member at the side of each wheel and mounted upon a portion of said means of pivotal connection, laterally extending links pivotally connected at their ends with the bar-like members of each pair of front wheels and each pair of rear wheels, respectively, a slidably arranged rack provided with an upwardly extending post, a second pair of links pivotally connected at one end with said post and each link being pivotally connected at its opposite end with the bar-like member of a front and rear wheel, respectively, a toothed sector in mesh with the rack for operating the same, an arm extending from said toothed sector, a steering-means under the control of the operator in the vehicle, a crank-arm connected with the same, and a connecting rod between said crank-arm and the arm of the toothed sector, substantially as and for the purposes set forth.

4. In a motor-vehicle, the combination with fixed front and rear axles, of an axle-element pivotally connected with each end-portion of an axle, each axle-element swinging in a horizontal plane only, a vehicle-wheel having a hub rotatably mounted upon each axle-element, and means for revolving said wheels, consisting of a ring-shaped member secured upon and extending from the side of each wheel, a second ring-shaped member provided with a bearing-portion rotatably arranged upon a portion of the fixed axle, a driving-wheel upon said bearing-portion, an intermediate ring-shaped member between said other two ring-shaped members, and a means of oscillatory connection between said respective ring-shaped members, a bar-like member mounted upon each axle-element and located upon the side of each wheel, laterally extending links pivotally connected at their ends with the bar-like members of each pair of front wheels and each pair of rear wheels, respectively, a second pair of links pivotally connected with each other at one end, and each link being pivotally connected at its opposite end with the bar-like member of a front and rear wheel, respectively, and means connected with said second pair of links for actuating all of said link-connections, substantially as and for the purposes set forth.

5. In a motor-vehicle, the combination with fixed front and rear axles, of an axle-element pivotally connected with each end-portion of an axle, each axle-element swinging in a horizontal plane only, a vehicle-wheel having a hub rotatably mounted upon each axle-element, and means for revolving said wheels, consisting of a ring-shaped member secured upon and extending from the side of each wheel, a second ring-shaped member provided with a bearing-portion rotatably arranged upon a portion of the fixed axle, a driving-wheel upon said bearing-portion, an intermediate ring-shaped member between said other two ring-shaped members, and a means of oscillatory connection between said respective ring-shaped members, a bar-like member mounted upon each axle-element and located upon the side of each wheel, laterally extending links pivotally connected at their ends with the bar-like member of each pair of front wheels and each pair of rear wheels, respectively, a slidably arranged rack provided with an upwardly extending post, a second pair of links pivotally connected at one end with said post, and each link being pivotally connected at its opposite end with the bar-like member of a front and rear wheel, respectively, a toothed sector in mesh with the rack for operating the same, and means for oscillating said toothed sector, substantially as and for the purposes set forth.

6. In a motor-vehicle, the combination with fixed front and rear axles, of an axle-element pivotally connected with each end-portion of an axle, each axle-element swinging in a horizontal plane only, a vehicle-wheel having a hub rotatably mounted upon each axle-element, and means for revolving said wheels, consisting of a ring-shaped member secured upon and extending from the side of each wheel, a second ring-shaped member provided with a bearing-portion rotatably arranged upon a portion of the fixed axle, a driving-wheel upon said bearing-portion, an intermediate ring-shaped member between said other two ring-shaped members, and a means of oscillatory connection between said respective ring-shaped members, a bar-like member mounted upon each axle-element and located upon the side of each wheel, laterally extending links pivotally connected at their ends with the bar-like members of each pair of front wheels and each pair of rear wheels, respectively, a slidably arranged rack provided with an upwardly extending post, a second pair of links pivotally connected at one end with said post, and each link being pivotally connected at its opposite end with the bar-like member of a front and rear wheel, respectively, a toothed sector in mesh with the rack for operating the same, an arm extending from said toothed sector, a steering-means under the control of the operator in the vehicle, a crank-arm connected with the same, and a connecting rod between said crank-arm and the arm of the toothed sector, substantially as and for the purposes set forth.

7. In a motor-vehicle, the combination with a frame-work and fixed front and rear axles, of an axle-element pivotally connected with each end-portion of an axle, each axle-element swinging in a horizontal plane only, a vehicle-wheel having a hub rotatably mounted upon each axle-element, and means for revolving said wheels, consisting of a ring-shaped member secured upon and extending from the side of each wheel, a second ring-shaped member provided with a bearing-portion rotatably arranged upon a portion of the fixed axle, a pulley-wheel upon each bearing-portion, an intermediate ring-shaped member between said other two ring-shaped members, and a means of oscillatory connection between said respective ring-shaped members, anti-friction roller-bearings arranged in the hub of each wheel and in the bearing-portion of each second-mentioned ring-shaped member, a counter-shaft mounted upon said frame-work, pulleys upon said counter-shaft, and flexible power-transmission means between the pulleys of said counter-shaft and the pulleys upon the bearing-portions of said ring-shaped members, a bar-like member mounted upon each axle-element and located upon the side of each wheel, laterally extending links pivotally connected at their ends with the bar-like members of each pair of front wheels and each pair of rear wheels, respectively, a slidably arranged rack provided with an upwardly extending post, a second pair of links pivotally connected at one end with said post, and each link being pivotally connected at its opposite end with the bar-like member of a front and rear wheel, respectively, a toothed sector in mesh with the rack for operating the same, and means for oscillating said toothed sector, substantially as and for the purposes set forth.

8. In a motor-vehicle, the combination with a framework and fixed front and rear axles, of an axle-element pivotally connected with each end-portion of an axle, each axle-element swinging in a horizontal plane only, a vehicle-wheel having a hub rotatably mounted upon each axle-element, and means for revolving said wheels, consisting of a ring-shaped member secured upon and extending from the side of each wheel, a second ring-shaped member provided with a bearing-portion rotatably arranged upon a portion of the fixed axle, a pulley-wheel upon each bearing-portion, an intermediate ring-shaped member between said other two ring-shaped members, and a means of oscillatory connection between said respective ring-shaped members, anti-friction roller-bearings arranged in the hub of each wheel and in the bearing-portion of each second mentioned ring-shaped member, a counter-shaft mounted upon said frame-work, pulleys upon said counter-shaft, and flexible power-transmission means between the pulleys of said counter-shaft and the pulleys upon the bearing-portions of said ring-shaped members, a bar-like member mounted upon each axle element and located upon the side of each wheel, laterally extending links pivotally connected at their ends with the bar-like members of each pair of front wheels and each pair of rear wheels, respectively, a slidably arranged rack provided with an upwardly extending post, a second pair of links pivotally connected at one end with said post, and each link being pivotally connected at its opposite end with the bar-like member of a front and rear wheel, respectively, a toothed sector in mesh with the rack for operating the same, an arm extending from said toothed sector, a steering-means under the control of the operator in the vehicle, a crank-arm connected with the same, and a connecting rod between said crank-arm and the arm of the toothed sector, substantially as and for the purposes set forth.

In testimony, that I claim the invention set forth above I have hereunto set my hand this 25th day of March, 1908.

EDMUND R. HALSEY.

Witnesses:
FREDK. C. FRAENTZEL,
ANNA H. ALTER.